June 6, 1944.  J. L. AMOS ET AL  2,350,320

METHOD OF PRODUCING CARBON BISULPHIDE

Filed Feb. 14, 1942

INVENTORS
James L. Amos
Ray H. Boundy
Kenneth E. Stober
BY
Griswold & Burdick
ATTORNEYS

Patented June 6, 1944

2,350,320

UNITED STATES PATENT OFFICE 2,350,320

METHOD OF PRODUCING CARBON BISULPHIDE

James L. Amos, Ray H. Boundy, and Kenneth E. Stober, Midland, Mich., assignors to The Dow Chemical Company, Midland, Mich., a corporation of Michigan Application February 14, 1942, Serial No. 430,922

1 Claim. (Cl. 23—206)

This invention is concerned with an apparatus for transferring heat to corrosive fluids and, more particularly, with a sulphur superheater.

The manufacture of carbon bisulfide by the reaction of charcoal with sulphur is preferably carried out at reaction temperatures of about 700–850° C. However, because of the low heat conductivity of the reactor walls and the charcoal-sulphur mixture, attainment of these temperatures by external heating of the reaction vessel is difficult, and it has been found desirable to supplement the external heating by introducing the sulphur into the reaction mixture in the form of vapor and thereby supply heat to the interior of the reaction mass. Further, it has been found that the rate of production of carbon bisulphide can be increased several fold by superheating the sulphur vapor entering the reaction mixture from its boiling temperature of about 445° C. to a temperature of about 700–850° C. However, success in heating the vapor to these high temperatures has been limited by the corrosive action of the hot sulphur vapors on the interior surfaces of sulphur superheaters; by the fact that few materials of construction can withstand direct heating to such temperatures, particularly by hot oxidizing gases; and by the fact that economical operation of a superheater requires good heat transfer through the walls of the superheater to the rapidly moving sulphur vapors.

It is, therefore, the principal object of this invention to provide a sulphur superheater the inner surface of which is not corroded by hot sulphur vapors, which has good heat transfer properties, and which can withstand direct heating by hot gases. It is a further object to provide an apparatus for transferring heat to corrosive fluids.

We have now found that the foregoing and related objects can be accomplished with a conduit or sulphur superheater consisting of an inner surface of graphite and an outer surface of iron, carbon-steel, or a heat resistant alloy steel. In passing through the conduit or superheater, the hot sulphur vapor or other similarly corrosive fluid comes in contact with a graphite surface, to which it is not corrosive; and the hot gases used for heating come in contact with an iron, carbon-steel, or heat resistant alloy steel surface, these metals being strong structurally as well as being resistant to hot gases at high temperatures.

A preferred embodiment of the invention may be explained in detail with reference to the accompanying drawing in which.

Figure 1:
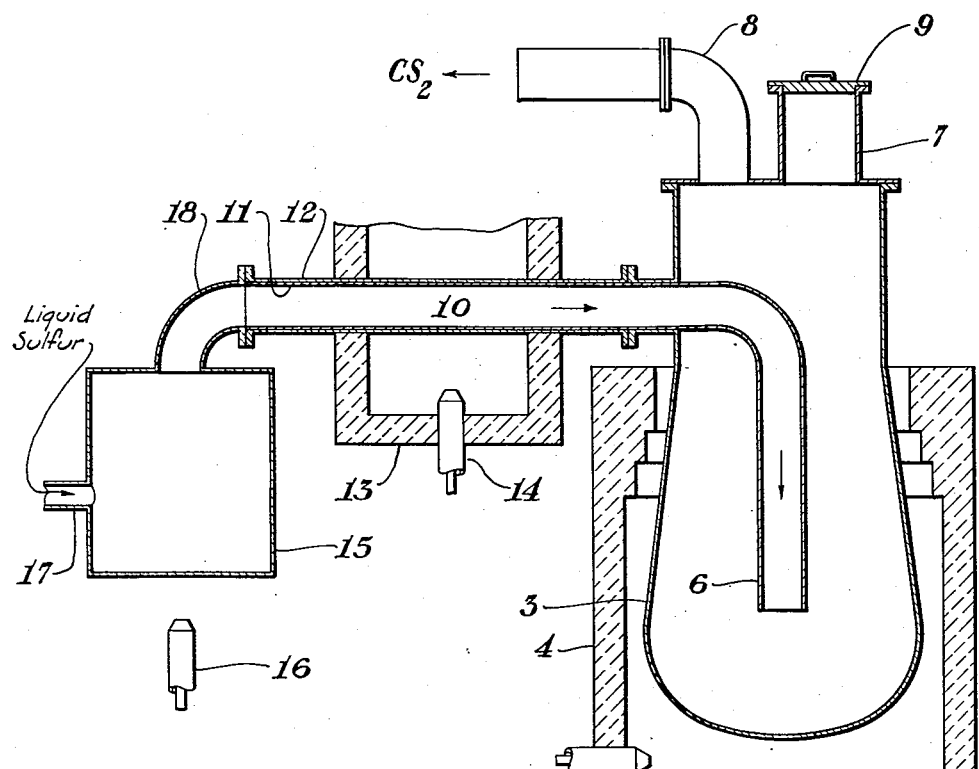
Fig. 1 shows a cross-sectional view of an apparatus for the manufacture of carbon bisulphide having incorporated therewith the sulphur superheater of the present invention.
Figure 2:
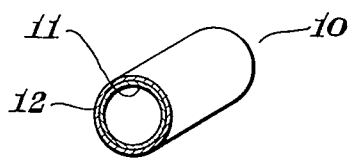
Fig. 2 shows in more detail the structure of the sulphur superheater.

In the apparatus as shown in Fig. 1, a pear-shaped reactor 3 is situated inside a furnace 4, heated by means of the gas burner 5 and is provided with a sulphur vapor inlet pipe 6, a charcoal inlet port 7, and a carbon bisulphide outlet 8. The charcoal inlet port 7 is provided with a removable lid 9 which is closed when carbon bisulphide is being generated in the reactor 3. The sulphur inlet pipe 6, preferably graphite, is connected with a sulphur superheater 10 which consists of a conduit having an inner surface 11 of graphite and an outer surface 12 of iron, carbon-steel, or heat resistant alloy steel. The superheater is shown in more detail in Fig. 2. The superheater passes through a furnace 13 in which it is heated by means of the gas burner 14, or by other usual means. A sulphur vaporizer 15, heated by usual means, e. g. the gas burner 16, is provided with a liquid sulphur inlet pipe 17 and a vapor outlet 18, the latter connecting with the superheater 10.

In producing carbon bisulphide with the apparatus illustrated in Fig. 1, sulphur is fed into the vaporizer 15 where it is heated to vaporize the same and the vapor is passed through the improved superheater 10 where it is heated to about 700–850° C. It then flows into the bed of charcoal in the reactor 3, the latter being subjected to external heating such that the reactor shell temperature is preferably about 900° C. Charcoal is added as needed to the reactor through the charcoal inlet port 6. In this manner the desired reaction temperature of about 700–850° C. is readily attained and carbon bisulphide is produced in good yield.

The superheater is preferably made by casting the iron or steel around a graphite tube. This method results in a very tight graphite-to-metal bond and also results in good heat transfer properties. There are, however, other ways in which the superheater may be constructed. One such method is to cement a graphite tube inside an iron or steel tube by means of graphite cement. A graphite cement especially suitable for this purpose is described in U. S. Patent No. 2,270,199, issued January 13, 1942, to R. I. Thrune, and consists of graphite, a normally liquid coal tar, and a halogenated organic compound; the latter being reactive with the tar at elevated temperatures. Another method, especially suitable for the alloy steels, is to insert a graphite tube inside a close-fitting hot steel tube and cool the steel to obtain a shrink fit.

The graphite tube is preferably one of low porosity in order the minimize attack of the sulphur vapor on the interior surface of the iron. This attack produces a layer of iron sulphide, usually of less than 1/16 inch thickness, which serves to check further reaction. The principal disadvantage of the iron sulphide deposit is the lowering of the heat conductivity of the superheater. The exterior surface of the superheater is preferably iron, carbon-steel, or a heat resistant alloy steel because of the resistance of these metals to hot oxidizing gases, particularly at high temperatures. Many other metals are unable to withstand an oxidizing atmosphere or become fused or deformed at the operating temperatures. The term "heat resistant alloy steel" has been accepted in engineering usage as meaning an alloy steel whose heat resisting properties are superior or at least equal to those of carbon-steel. The term is used accordingly herein. The use of hydrocarbon fuels has been recommended from the standpoint of economy, but it will be apparent that other methods of heating, e. g. electrical, can be used if convenient.

As pointed out above, the conduit of the present invention can be used for transferring heat to corrosive fluids other than superheated sulphur vapor. Examples of such other corrosive fluids which can be heated in the conduit are phosphorus vapor, chlorine, and aqueous solutions of caustic, ferric chloride, acids such as hydrochloric, etc.

Use of the present invention has proved very advantageous. It was found upon operation of the new superheater that hot oxidizing gases had no substantial effect on the exterior metal surface and that sufficient heat from economical sources could be readily and efficiently transferred to the sulphur vapor to heat it to temperatures of 700–850° C. It was found, further, that the superheated sulphur vapor had no apparent effect on the interior surface of the superheater over long periods of time and, even where the graphite was somewhat porous, did not seriously injure the interior surface of the iron or carbon-steel.

We claim:

A process of producing carbon bisulphide comprising vaporizing sulphur, passing the sulphur vapor through a superheater having an outer surface of a metal from the group consisting of iron, carbon-steel, and heat-resistant alloy steels and an inner surface of graphite, heating the sulphur vapor in said superheater to a temperature of between 700 and 850° C., passing the superheated sulphur vapor into a reactor and there reacting it with carbon to form carbon bisulphide.

JAMES L. AMOS.
RAY H. BOUNDY.
KENNETH E. STOBER.